United States Patent [19]

Heitz

[11] Patent Number: 4,814,135

[45] Date of Patent: Mar. 21, 1989

[54] PROCESS FOR EXTRUSION

[75] Inventor: William D. Heitz, Flagtown, N.J.

[73] Assignee: Union Carbide Corporation, Danbury, Conn.

[21] Appl. No.: 136,719

[22] Filed: Dec. 22, 1987

[51] Int. Cl.$^4$ ............................................. B29C 61/02
[52] U.S. Cl. .................... 264/564; 264/230; 264/342 R; 525/240; 526/348.1; 526/348.2
[58] Field of Search ..................... 264/564, 514, 176.1, 264/210.1, 210.8, 230, 342 R; 425/326.1, 467; 526/348.1, 348.2; 525/240

[56] References Cited

U.S. PATENT DOCUMENTS

| | | | |
|---|---|---|---|
| 4,277,594 | 7/1981 | Matthews et al. | 264/514 |
| 4,354,997 | 10/1982 | Mizutani et al. | 264/564 |
| 4,540,538 | 9/1985 | Corwin et al. | 264/300 |
| 4,594,213 | 6/1986 | Ealer | 264/564 |
| 4,652,490 | 3/1987 | Arita et al. | 264/176.1 |

FOREIGN PATENT DOCUMENTS

| | | | |
|---|---|---|---|
| 632346 | 12/1961 | Canada | 264/567 |
| 0048227 | 3/1982 | European Pat. Off. | 264/210.1 |
| 0151343 | 8/1985 | European Pat. Off. | 264/176.1 |
| 57-34920 | 2/1982 | Japan | 264/209.3 |
| 61-16905 | 1/1986 | Japan | 264/230 |

*Primary Examiner*—Jeffery Thurlow
*Attorney, Agent, or Firm*—Saul R. Bresch

[57] ABSTRACT

A process for extrusion comprising extruding, under conditions which will provide a shrink film, a linear low density copolymer of ethylene and at least one alpha-olefin having 3 to 6 carbon atoms, said copolymer having (i) a density in the range of about 0.915 to about 0.932 grams per cubic centimeter; (ii) a weight average molecular weight of at least about 250,000, (iii) a ratio of weight average molecular weight to number average molecular weight of at least about 6; and (iv) a copolymer species with a molecular weight of at least about 500,000 in an amount of at least about 8 percent by weight based on the weight of the copolymer.

7 Claims, No Drawings

:::

PROCESS FOR EXTRUSION

TECHNICAL FIELD

This invention relates to a process for extrusion whereby shrink film is produced.

BACKGROUND ART

For many years, high pressure low density polyethylenes, which are highly branched polymers, were considered to be the resin of choice for commercial shrink film applications. The key property that facilitates the use of high pressure low density polyethylene for these applications is the long chain branching. The long chain branching makes possible the development of high melt stresses, which can be frozen into the film at the frost line during tubular film extrusion. In other words, sufficient strain hardening occurs during tubular film extrusion, for example, to generate in the film the frozen stresses that are required for shrink film applications. Under shrink tunnel conditions, the frozen-in stresses cause the film to shrink around the item to be packaged thus securing it firmly. These resins also have a relatively low stress relaxation rate, which facilitates a retention of the shrink forces needed to provide support for the packaged goods.

Unlike high pressure low density polyethylene, narrow molecular weight distribution linear low density polyethylene commonly used for tubular film extrusion has only short chain branching, the branches corresponding in length to the alpha--olefin that is copolymerized with ethylene to produce it. Without long chain branching, however, narrow molecular weight distribution linear low density polyethylene stresses relax too rapidly during melt extrusion to provide the high melt stresses, which can be frozen into the film. This is particularly true of the transverse direction of the narrow molecular weight distribution linear low density polyethylene film, which is stretched much less than the machine direction during film extrusion and, therefore, has virtually no shrinkage in that direction. As a result, narrow molecular weight distribution linear low density polyethylene is unacceptable for shrink film application because it sags around the material to be packaged instead of holding it securely.

Manufacturers of linear low density polyethylene (LLDPE) were, therefore, seeking to identify an LLDPE, which was suitable for shrink film applications; was easier to process than the high pressure low density polyethylene resins; and, finally, would result in a film, which would outperform high pressure resin films in terms of those properties most desirable in shrink films.

DISCLOSURE OF THE INVENTION

An object of this invention, therefore, is to provide a process for extrusion utilizing a particular LLDPE to produce a film especially tailored for shrink film applications.

Other objects and advantages will become apparent hereinafter.

According to the present invention, the above object is met by a process for extrusion comprising extruding, under conditions which will provide a shrink film, a linear low density copolymer of ethylene and at least one alpha-olefin having 3 to 6 carbon atoms, said copolymer having (i) a density in the range of about 0.915 to about 0.932 gram per cubic centimeter; (ii) a weight average molecular weight of at least about 250,000; (iii) a ratio of weight average molecular weight to number average molecular weight of at least about 6; and (iv) a copolymer species with a molecular weight of at least about 500,000 in an amount of at least about 8 percent by weight based on the weight of the copolymer.

DETAILED DESCRIPTION

Shrink films can be produced by various extrusion techniques such as blown film extrusion and slot cast biaxial orientation extrusion. Tubular film extrusion is preferred, particularly air cooled blown tubular film extrusion. Typical apparatus and a procedure for blown tubular film extrusion is described in the examples below. The minimum values for critical shrink film properties, which are achieved by subject process are as follows: (i) shrinkage at 135° C. (approximate shrink tunnel temperature) in the machine direction is at least about 30 percent and in the transverse direction is at least about 10 percent; (ii) shrink forces with the regard to melt stress is zero or positive kilopascals and with regard to cooled stress is at least about 600 kilopascals; and (iii) melt strength in the machine and transverse directions is at least about 7 seconds. The preferred melt stress is about 5 to about 30 kilopascals; the preferred cooled stress is at least about 900 kilopascals; and the preferred melt strength is at least about 10 seconds. The only upper limits for these film properties are those that can be practically achieved.

The terms are defined as follows:

1. Machine direction is the direction in which the film web is pulled from the die of the film extruder.

2. Transverse direction is the direction of the web, which is perpendicular to the machine direction and parallel to the web.

3. Shrinkage (the percent change in film dimension) is determined as follows $$\text{Machine direction shrinkage (percent)} = \frac{LiMD - LsMD}{LiMD} \times 100$$

$$\text{Transverse direction shrinkage (percent)} = \frac{LiTD - LsTD}{LiMD} \times 100$$

wherein
LiMD = initial machine direction length
LsMD = machine direction length after shrinkage
LiTD = initial transverse direction length
LsTD = transverse direction length after shrinkage 4. Melt stresses are stresses frozen into the film at the frost line.

5. Cooled stresses are crystalline stresses remaining in the solidified film.

6. Melt strength is the resistance to deformation in the melt.

The broad molecular weight distribution, high molecular weight LLDPE copolymers can be produced using a vanadium trichloride based catalyst to copolymerize ethylene with at least one alpha- olefin having 3 to 6 carbon atoms per molecule. One technique for producing these copolymers using such a catalyst is described in European Patent application No. 0 120 501 published on Oct. 3, 1984. This application and other publications mentioned in this specification are incorporated by reference herein. Other conventional procedures for preparing these LLDPE copolymers using various catalysts can be used; however, the conditions have to be adjusted to provide the following properties: (i) a density in the range of about 0.915 to about 0.932 gram per cubic centimeter and preferably in the range of about 0.922 to about 0.928 gram per cubic centimeter; (ii) a weight average molecular weight of at least about 250,000, and preferably at least about 300,000; (iii) a ratio of weight average molecular weight to number average molecular weight of at least about 6, and preferably at least about 7; and (iv) a copolymer species with a molecular weight of at least about 500,000 in an amount of at least about 8 percent by weight based on the weight of te copolymer, and preferably at least about 12 percent by weight. There is no upper limit, insofar as items (ii), (iii), and (iv) are concerned, except the bounds of practicality.

The ratio of weight average molecular weight to number average molecular weight is known as polydispersity and is a measure of the breadth of the molecular weight distribution. The determination of copolymer species percentage is made using size exclusion chromatography (SEC). Typical SEC conditions are as follows: infrared detector; 1,2,4-trichlorobenzene solvent; gram per meter per meter IBM packed columns; 140° C. column temperature; 250 microliter sample size; 20° C. sample preparation temperature; 1.000 part per second; infrared cell THK (potassium salt plate)=1.0 millimeter; flow rate=1.004 milliliters/minute; concentration=0.2018 percent (weight per volume); attenuation=0.100.

The shrink film made by subject process, in addition to having the frozen stresses so important in shrink film applications, is capable of attaining higher puncture resistance, higher tensile strength, and greater toughness than its high pressure resin based counterpart.

The invention is illustrated by the following examples.

EXAMPLES 1 TO 10

The films prepared for the examples are made by blown tubular film extrusion. The extruder is equipped with a fluted mixing screw capable of providing the level of melt homogeneity that is found in current commercial tubular film extrusions. 3 inch and 6 inch bottom fed, spiral mandrel tubular film dies, each equipped with a 0.04 inch die pin, are used to extrude the polymer or copolymer. The size of the die orifice is maintained at 0.06 inch.

The films are extruded at a 9 pound/hour/ inch of die circumference die rate using a blow-up ratio (BUR) ranging from 1.5:1 to 3.0:1; melt temperatures in the range of about 240° C. to about 260° C.; and a frost line height of 12 inches.

Variations of these extrusion conditions to optimize film properties for specific applications can be made by anyone having ordinary skill in the art of stretch film extrusion.

The extruder is a 2.5 inch (63 millimeter) extruder having a 3 inch (75 millimeter) die and a 40 mil (1.0 millimeter) gap. The thickness of the film provided and tested is 100 microns except in examples 1, 2 and 3 where it is 110, 102, and 110 respectively. The temperatures are as follows: barrel profile=200° C.; adapter=210° C.; die=220° C.; and melt=260° C. The screw speed is 60 revolutions per minute (rpm); the melt pressure is 388 bars; the extrusion rate is 34 kilograms per hour; and the drive current is 80 amperes.

The polymer used in Examples 1, 2, 9, 10, and 11 is a high pressure low density homopolymer of ethylene prepared by the high pressure process described in Introduction to Polymer Chemistry, Stille, Wiley, N.Y., 1962, pages 149 to 151. The polymers used in the other ten examples are LLDPE copolymers of ethylene and an alpha-olefin having a high molecular weight and a broad molecular weight distribution. They are prepared using the catalyst system described in European Patent application No. 0 120 501, mantioned above. The polymers of Examples 3 and 4 have a medium molecular weight distribution; the polymer of Example 14 has a narrow molecular weight distribution; and the polymers of the remaining 12 examples have a broad molecular weight distribution.

Variables and film properties are set forth in the Table.

TABLE

| Example | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1. | Melt flow (dg/min) | 0.2 MI | 0.2 MI | 7 | 7 | 6 | 6 | 6 | 6 | 0.25 MI | 0.25 MI | 0.25 MI | 6.0 | 6.0 | 6.0 | 6.0 |
| 2. | Density (kg/m³) | 920 | 920 | 916 | 916 | 916 | 916 | 926 | 926 | 920 | 920 | 920 | 916 | 925 | 926 | 926 |
| 3. | Comonomer | — | — | C3 | C3 | C4 | C4 | C6 | C6 | — | — | — | C4 | C4 | C6 | C6 |
| 4. | Mw × 10⁻³ | — | — | 264 | 264 | 304 | 304 | 264 | 264 | — | — | — | 304 | — | 119 | 264 |
| 5. | Mw/Mn | — | — | 7 | 7 | 12 | 12 | 14 | 14 | — | — | — | 12 | — | 3.5 | 14 |
| 6. | Concentration of high molecular weight species (%) | — | — | 15 | 15 | 12 | 12 | 13 | 13 | — | — | — | 12 | — | — | 13 |
| 7. | Film gauge (microns) | 100 | 100 | 100 | 100 | 100 | 100 | 100 | 100 | 100 | 100 | 75 | 75 | 75 | 75 | 75 |
| 8. | Blow-up ratio | 1.5 | 3.0 | 1.5 | 3.0 | 1.5 | 3.0 | 1.5 | 3.0 | 1.5 | 3.0 | 2.5 | 2.5 | 2.5 | 2.5 | 2.2 |
| 9. | Dart impact (g) | 355 | 386 | 264 | 438 | 742 | 906 | 417 | 749 | 256 | 298 | — | 440 | 320 | — | 430 |
| 10. | ASTM Procedure B | | | | | | | | | | | | | | | |
| | ASTM Procedure A | — | — | — | — | — | — | — | — | — | — | 160 | — | — | 312 | — |
| | Elmendorf Tear (g/mil) | | | | | | | | | | | | | | | |
| | MD | 32 | 31 | 35 | 66 | 137 | 158 | 88 | 149 | — | — | 26 | 77 | 39 | 63 | 120 |
| | TD | 56 | 40 | 78 | 59 | 203 | 152 | 266 | 165 | — | — | 47 | 108 | 112 | 208 | 123 |
| 11. | Puncture resistance (J/mm) | 25 | 75 | 54 | 85 | 91 | 94 | 90 | 90 | — | — | 34 | 75 | 72 | 64 | 92 |
| 12. | Tensile strength (MPa) | | | | | | | | | | | | | | | |
| | MD | 25 | 22 | 33 | 31 | 46 | 45 | 43 | 47 | — | — | 25 | 38 | 36 | 34 | 41 |
| | TD | 20 | 24 | 29 | 29 | 34 | 46 | 38 | 46 | — | — | 23 | 41 | 34 | 29 | 41 |
| 13. | Tensile elongation (%) | | | | | | | | | | | | | | | |
| | MD | 440 | 520 | 610 | 670 | 580 | 650 | 520 | 620 | — | — | 590 | 610 | 570 | 630 | — |
| | TD | 590 | 520 | 730 | 700 | 660 | 640 | 720 | 648 | — | — | 620 | 640 | 660 | 660 | — |
| 14. | Haze (%) | 9.7 | 8.5 | 13.5 | 13.5 | — | 48 | — | 56 | — | — | — | — | — | — | — |
| 15. | 45 degree gloss (%) | 55 | 58 | 58 | 59 | — | 23 | — | 21 | — | — | — | — | — | — | — |
| 16. | Secant modulus (MPa) | | | | | | | | | | | | | | | |
| | MD | 168 | 161 | 224 | 217 | 286 | 282 | 296 | 276 | — | — | 165 | 196 | 301 | 308 | 336 |
| | TD | 147 | 161 | 196 | 217 | 344 | 303 | 413 | 301 | — | — | 190 | 217 | 322 | 413 | 343 |
| 17. | Melting point (°C.) | 108 | 108 | 121 | 121 | 121 | 121 | 124 | 124 | 108 | 108 | 108 | 121 | 124 | 124 | 124 |
| 18. | Shrinkage (%) at 124° C. | | | | | | | | | | | | | | | |
| | MD | 41 | 50 | 59 | 59 | 57 | 33 | 10 | 12 | 64 | 48 | — | — | — | <1 | — |
| | TD | 16 | 42 | 41 | 41 | 23 | 33 | 8 | 8 | 14 | 38 | — | — | — | <1 | — |
| 19. | Shrinkage (%) at 135° C. | | | | | | | | | | | | | | | |
| | MD | 66 | 58 | 62 | 50 | 59 | 50 | 61 | 55 | — | — | 61 | 52 | 59 | 18 | 62 |
| | TD | 25 | 52 | 21 | 30 | 22 | 33 | 29 | 33 | — | — | 38 | 35 | 32 | −3 | 28 |
| 20. | Melt stress (kPa) | | | | | | | | | | | | | | | |
| | MD | 87 | 54 | 12 | 42 | 83 | 59 | 100 | 56 | 98 | 51 | — | — | — | 2.0 | — |
| | TD | 10 | 31 | 5 | 29 | 5.8 | 34 | 0 | 29 | 9.7 | 28 | — | — | — | 0 | — |
| 21. | Cooled stress (kPA) | | | | | | | | | | | | | | | |
| | MD | 1044 | 896 | 820 | 743 | 2900 | 2600 | 3100 | 2400 | 1063 | 966 | — | — | — | 310 | — |
| | TD | 815 | 980 | 850 | 841 | 1620 | 2100 | 1600 | 1900 | 759 | 1021 | — | — | — | 6 | — |
| 22. | Melt strength at 135° C. (seconds) | | | | | | | | | | | | | | | |
| | MD | 50 | 39 | 26 | 13 | 71 | 40 | 95 | 67 | 87 | 42 | — | — | — | 8 | — |
| | TD | 9 | 17 | 10 | 7 | 9 | 21 | 7 | 15 | 8 | 21 | — | — | — | 6 | — |
| 23. | Melt strength at 124° C. (seconds) | | | | | | | | | | | | | | | |
| | MD | 88 | 84 | ↓ | ↓ | ↓ | ↓ | too low to measure | | ↑ | | ↑ | ↑ | ↑ | — | — |

TABLE-continued

| | 13 | 14 | | | | |
|---|---|---|---|---|---|---|
| TD | | | → | → | too low to measure | — |
| | | | | | ↑ | — |

NOTES TO TABLE:
1. Melt Flow is determined under ASTM D-1238-79 and is given in decigrams per minute. In examples 1, 2, 9, 10, and 11, melt index (MI) is given instead of melt flow. Melt index is determined under ASTM D-1238, Condition E. It is measured at 190° C. and reported as grams per 10 minutes.
2. Density is determined under ASTM D-1505. A plaque is made and conditioned for one hour at 100° C. to approach equilibrium crystallinity. Measurement for density is then made in a density gradient column and density values are reported in kilogram per cubic meter.
3. The comonomer used with ethylene is an alpha-olefin, either propylene, 1-butene, or 1-hexene.
4. Mw is weight average molecular weight. It is given as Mw × $10^{-3}$.
5. Mw/Mn is the ratio of weight average molecular weight to number average molecular weight. This ratio is referred to as polydispersity, which is a measure of the molecular weight distribution.
6. Concentration of high molecular weight species is the percent by weight of copolymer having a molecular weight of at least about 500,000. It is based on the weight of the total copolymer.
7. Film gauge is the thickness of the film. The value is given in microns.
8. Blow-up ratio is the ratio of die diameter to bubble diameter. The bubble diameter is determined as follows: 2 × layflat/pi. The "layflat" refers to the width of a flattened bubble.
9. Dart impact is determined under ASTM D-1709, methods A and B. It is given in grams.
10. Elmendorf Tear is determined under ASTM D-1992. It is given in grams per mil.
(i) MD = machine direction
(ii) TD = transverse direction
11. Puncture resistance is defined as the force required to rupture a test specimen and the energy absorbed by the film during rupture. It is determined using an "Instron" compression tester. The specimens to be tested are conditioned for a minimum of 40 hours at above 23° C. and a relative humidity of 50 and tests are performed under these conditions. The crosshead speed is 20 inches per minute and the chart speed is 10 inches per minute. A 0 to 5 pound full range scale is used for fibers having a nominal thickness of 0.5 mil. A 0 to 10 pound full range scale is used for films having a nominal thickness of 1.0 mil. The plunger is set to have a downward travel of 6 inches.

The average energy to rupture in inch-pounds is equal to $\frac{(X - K) L \times S}{5000}$ wherein X = average integrator reading
K = average correction factor L = full scale load in pounds
S = rate of sample extension
In this test procedure, S = 20 inches per minute and 5000 is based on a full scale integration carried out for one minute resulting in a count of 5000. It is given in inch-pound/mil.
12. Tensile Strength is determined under ASTM D-882. It is given in millipascals (MPa).
13. Tensile elongation is determined under ASTM D-882. The value is in percent (%).
14. Haze is determined under ASTM D-1003. The value is in percent (%).
15. 45 degree gloss is determined under ASTM D-523. It is given in percent (%).
16. Secant modulus is determined under ASTM D-882. The value is in millipascals (MPa).
17. The melting point is given in degrees Centigrade.
18. and 19. Shrinkage is determined as follows: A 3 inch × 3 inch film specimen is cut so that the MD and TD directions are parallel to the sides of the specimen. The specimen is placed in a circulating oil bath at 124° C. for 60 seconds using a suitable holder such that the film can shrink freely, but not curl. The specimen is removed from the bath and quenched briefly in water. The MD and TD shrinkage is obtained by measuring the specimen in the MD and TD direction and making the following calculation:

Percent Shrinkage = $\frac{\text{Initial Width minus Final Width}}{\text{Initial Width}} \times 100$ The value is in percent
20. and 21. Melt stress and cooled stress are determined as follows: A film specimen one inch wide is clamped in a set of "Instron" jaws set that they are six inches apart. With the "Instron" jaws stationary, a 500-watt radiant heater is swung in at a given distance from the film causing the film to melt and start to shrink. The stress in the melt state is recorded as a load on the "Instron" chart. As the melt stress begins to decay, the heater is removed and the film is allowed to cool. The cooled stress (load stability developed) is also recorded on the "Instron" chart. The stress in the cooled and melt state is obtained by dividing the recorded load by the original cross-section of the film. This measurement is done in both the MD and TD directions. The values are given in kilopascals (KPa).
22. and 23. The melt strength of a shrink film can be defined as that property which resists thinning and subsequent hole formation (burnthrough) when subjected to the shrink stresses released while the film is in the molten state in the shrink oven. Melt strength is measured by clamping a suitable weight to a film specimen 1 inch × 1 inch in dimension so as to measure the property in either the machine or transverse direction. The weighted specimen is then completely immersed in an oil bath at an elevated temperature (usually 124° C.). Then, the time for the film to pull apart under the weight attached is recorded as the melt strength in seconds. For example, for a four mil sample, an 18 gram weight is usually used which gives a stress of 8.3 psi in oil. Failure time is usually between 10 to 70 seconds. Temperatures and weights are varied according to film thickness and melting point.
Additional Note To Table:
The product of example 14 is unacceptable for shrink film applications.

I claim:

1. A process for extrusion comprising extruding, under conditions which will provide a shrink film, a linear low density copolymer of ethylene and at least one alpha olefin having 3 to 6 carbon atoms, said copolymer having (i) a density in the range of about 0.915 to about 0.932 grams per cubic centimeter; (ii) a weight average molecular weight of at least about 250,000, (iii) a ratio of weight average molecular weight to number average molecular weight of at least about 6; and (iv) a copolymer species with a molecular weight of at least about 500,000 in an amount of at least about 8 percent by weight based on the weight of the copolymer.

2. The process defined in claim 1 wherein the copolymer has (i) a density in the range of about 0.924 to about 0.928 grams per cubic centimeter; (ii) a weight average molecular weight of at least about 300,000; (iii) a ratio of weight average molecular weight to number average molecular weight of at least about 7; and (iv) a concentration of high molecular weight species with a molecular weight of at least about 500,000 in an amount of at least about 12 percent by weight.

3. The shrink film produced by the process defined in claim 1.

4. The shrink film produced by the process defined in claim 2.

5. The shrink film defined in claim 3 having the following properties:
    (i) a shrinkage at about 135° C. of at least about 30 percent in the machine direction and at least about 10 percent in the transverse direction;
    (ii) melt stress is zero or positive kilopascals;
    (iii) a cooled stress of at least about 600 kilopascals; and
    (iv) a melt strength in the machine and traverse directions at about 135° C. of at least about 7 seconds.

6. The shrink film defined in claim 4 having the following properties:
    (i) a shrinkage at about 135° C. of at least about 30 percent in the machine direction and at least about 10 percent in the transverse direction;
    (ii) melt stress is zero or positive kilopascals;
    (iii) a cooled stress of at least about 600 kilopascals; and
    (iv) a melt strength in the machine and transverse directions at about 135° C. of at least about 7 seconds.

7. A process for shrinking a film around an item of goods comprising contacting the item of goods with a film provided by the process defined in claim 1 at a temperature in the range of about 135° C. to about 250° C. in such a manner that the film surrounds the item of goods and shrinks until the film substantially conforms to the outer surface of the item of goods.

* * * * *